(12) United States Patent
Geisheimer et al.

(10) Patent No.: US 7,483,800 B2
(45) Date of Patent: Jan. 27, 2009

(54) PEAK DETECTION AND CLUTTER REDUCTION FOR A MICROWAVE SENSOR

(75) Inventors: Jonathan Geisheimer, Neyruz (CH); Thomas Holst, Villars-sur-Glâne (CH)

(73) Assignee: Radatec, Inc., Londonderry, NH (US)

(*) Notice: Subject to any disclaimer, the term of this patent is extended or adjusted under 35 U.S.C. 154(b) by 44 days.

(21) Appl. No.: 11/809,499

(22) Filed: Jun. 1, 2007

(65) Prior Publication Data
US 2008/0195338 A1   Aug. 14, 2008

Related U.S. Application Data

(60) Provisional application No. 60/810,105, filed on Jun. 1, 2006.

(51) Int. Cl.
*G01R 23/16* (2006.01)
(52) U.S. Cl. .................. 702/77; 702/71; 702/73; 702/75; 702/76; 702/85; 702/87; 702/88
(58) Field of Classification Search .................. 702/71, 702/73, 75, 76, 85, 87, 88
See application file for complete search history.

(56) References Cited

U.S. PATENT DOCUMENTS 6,584,849 B2 * 7/2003 Loftus et al. .................. 73/659

FOREIGN PATENT DOCUMENTS

WO   WO-95/35484   12/1995

OTHER PUBLICATIONS

International Search Report, PCT/US2007/012920, Sep. 4, 2008.

* cited by examiner

*Primary Examiner*—Tung S Lau
*Assistant Examiner*—Sujoy K Kundu
(74) *Attorney, Agent, or Firm*—King & Spalding LLP

(57) ABSTRACT

An effective methodology for reducing the influence of clutter arising from a complex signal environment defined by the use of a microwave sensor within or in connection with a gas turbine engine having one or more stages of rotating blades. Accurate detection of peak signals for blade measurements can be obtained by the microwave sensor.

2 Claims, 6 Drawing Sheets

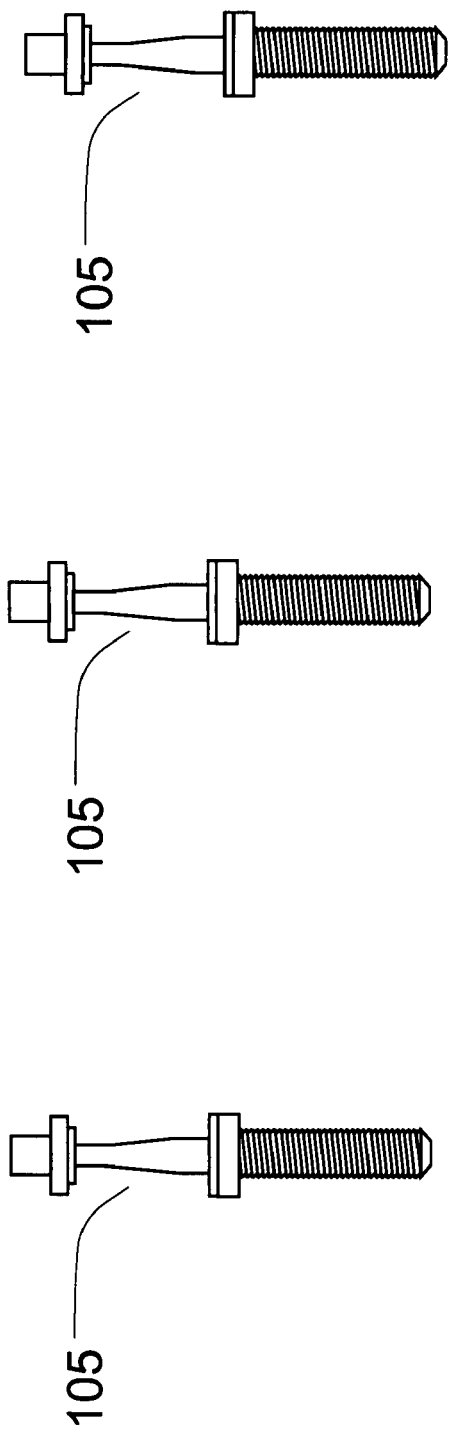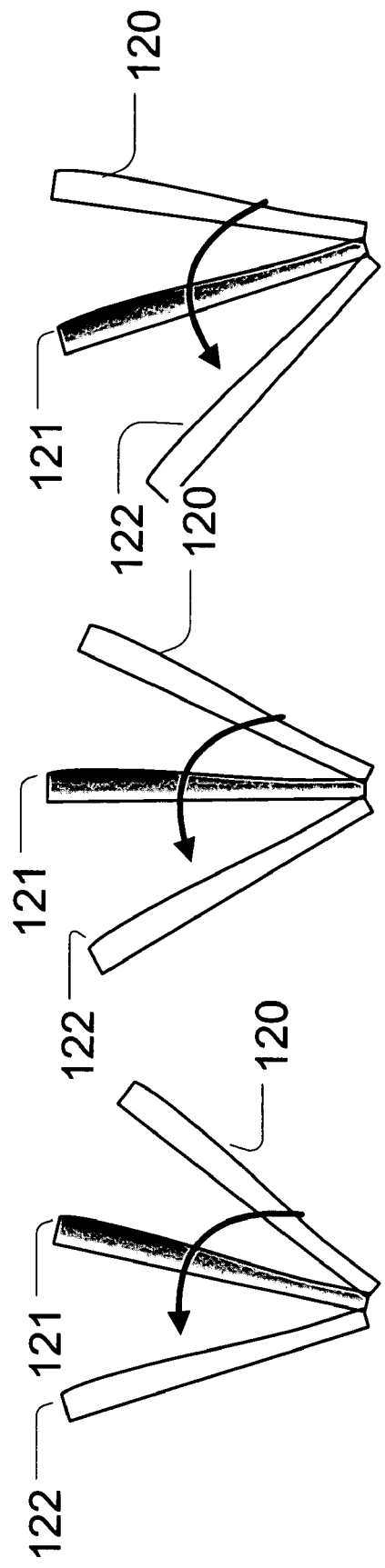

PEAK DETECTION AND CLUTTER REDUCTION FOR A MICROWAVE SENSOR

RELATED APPLICATION

Applicants claim priority under 35 U.S.C. 119 to an earlier-filed provisional patent application, U.S. Provisional Patent Application Ser. No. 60/810,105, filed on Jun. 1, 2006, entitled "Peak Picking Based on Harmonic and Velocity Filtering". The subject matter disclosed by this provisional patent application is fully incorporated within the present application by reference herein.

TECHNICAL FIELD

The present invention relates to microwave sensors and more particularly to peak detection in microwave sensors for measuring turbine blades or similarly shaped objects.

BACKGROUND OF INVENTION

Microwave techniques are known for measuring certain physical parameters within a gas turbine engine, such as blade tip clearance, which is the distance between the end of the blade and the turbine casing. Gas turbine engines provide some of the hottest environments for temperature measurements. Gas path temperatures can exceed 2000° F., which is beyond the melting points of most metals.

Antennas are typically used to transmit and receive electromagnetic energy within ambient temperature environments and in connection with a variety of devices, such as mobile phones, radios, global positioning receivers, and radar systems. Microwave sensors can also include one or more antennas to support the propagation of microwave signals within the desired measurement environment of a gas turbine engine. As an electromagnetic wave, the microwave signal will typically diverge and cover a larger area as the energy propagates further away from the antenna. The beamwidth characteristic of an antenna is typically measured as the angle at which the transmitted power is 3 dB below the on axis, or boresight power. Antennas used with microwave sensors for gas turbine engine measurements can have beamwidths that are 90 degrees or larger.

Turbine engines typically have various internal stages comprising a set of blades attached to a rotating disk. A microwave sensor can be mounted through a hole or attached to the inside of the engine case to enable the antenna to cast its beam onto the blades, which will be rotating by the antenna during engine operation. The blades rotate close to the position of the sensor within the casing, typically in the range of 0.1 to 1 inch separation between each blade and the sensor position. For accurate measurements, such as blade tip clearance or time of arrival, it is desirable to receive energy only from the tip area of the blade. Microwave signals travel much further distances than 1 inch, however, resulting in the transmission of microwave signals that travel past the blade tips to the edges of the blade or other parts of the engine. Therefore, the resulting signal received by the microwave sensor often contains reflections from other objects that are not the target of interest, commonly referred to as clutter.

Conventional techniques for removing clutter include (i) range gating or (ii) modeling clutter statistics and applying subtraction techniques to remove the influence of the interfering signal. Often, the clutter is close to the target of interest, a few inches away or less. For example, for the typical turbine engine measurement scenario, the bandwidth for range gating would be several GHz or more, which is impractical due to cost and difficulties in antenna design. Clutter subtraction techniques are insufficient for typical turbine engine measurements because the measurement of turbine blades using a microwave sensor require phase accuracies of less than one degree. Current clutter removal techniques are not capable of addressing this phase accuracy requirement. Therefore, another method of removing clutter from microwave sensor measurements is desirable for the operating environment of a gas turbine engine.

The output waveforms for a typical microwave sensor used for blade measurements of a gas turbine engine have complex features as a result of microwave signal interaction with a complex turbine blade geometry. The identification of a single point on an output waveform for tip clearance or time of arrival measurements can be difficult as a result of thee complex signal features. Typical peak detection methods, such as a polynomial curve fit, are too computationally intensive for the measurement of blades in real-time. Methods for finding a single point on the blade with the highest return signal can present variable results as the blade twists and changes dimensionally during normal operation. Nevertheless, a well defined, repeatable point for the engine blade is desirable for most blade tip measurements applications.

In view of the foregoing, there is a need in the art for adapting the use of a microwave sensor to achieve blade measurements that are based on a repeatable point for the blade tip by minimizing the influence of interfering clutter signals.

SUMMARY OF INVENTION

The present invention provides an effective methodology for reducing the influence of clutter arising from a complex signal environment representative of the use of a microwave sensor with a gas turbine engine while achieving the accurate detection of peak signals for blade measurements obtained by the microwave sensor.

In connection with an innovative blade measurement process, a coherent signal is output by a microwave sensor attached to an antenna located within a gas turbine engine or other similar machine. The gas turbine engine include one or more stages of rotating blades within a confined operating environment formed by the casing of the engine. The antenna is typically placed in close proximity to the blade tip, often with a clearance of no more than 0.1 inch to 1 inch. The coherent microwave signal is converted to digital format and a complex Fast Fourier Transform (FFT) is performed on the digitized signal. The output of the FFT calculation is then divided into components comprising velocities representing the movement of blades toward the antenna and velocities representing the movement of blades away from the antenna. These individual components are processed by an inverse Fast Fourier Transform (IFFT) to convert the components from the frequency domain to the time domain. The resulting complex time domain signals represent approaching and recessing velocity components.

The complex time domain signals are converted into magnitude and phase components associated with the approaching and recessing velocities. The magnitude components represent the amount of reflected energy received by the sensor's antenna and the phase components represent the distance to the reflecting objects. To determine if a blade is present in the component data, the signal strength of the magnitude components is compared to a pre-defined threshold to detect when a blade is passing underneath the antenna of the microwave sensor.

Upon detecting the blade region, the phase components associated with the approaching and recessing velocities are compared to determine a point where the two values are equal. This point is considered the zero velocity point—the point where, from an electromagnetic perspective, the blade is directly underneath the antenna. At the zero velocity point, the phase measurement is noted for use as an index for the processing of blade data. All measurements for the blade can be taken at the appropriate data index for either the velocity filtered data or the original coherent data. This process can be repeated for the next blade in a rotation of blades for the turbine engine.

Other systems, methods, features, and advantages of the present invention will be or become apparent to one with skill in the art upon examination of the following drawings and detailed descriptions. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

FIG. 2a is a representation of a turbine engine blade being measured by a microwave sensor, where the blade of interest (the center blade) moves with an approaching velocity with respect to the sensor's antenna in accordance with one embodiment of the present invention.

FIG. 2b is a representation of a turbine engine blade being measured by a microwave sensor, where the blade of interest (the center blade) is positioned at the zero velocity point with respect to the sensor's antenna in accordance with one embodiment of the present invention.

FIG. 2c is a representation of a turbine engine blade being measured by a microwave sensor, where the blade of interest (the center blade) moves with a receding velocity with respect to the sensor's antenna in accordance with one embodiment of the present invention.

DETAILED DESCRIPTION OF THE EXEMPLARY EMBODIMENTS

Figure 1:
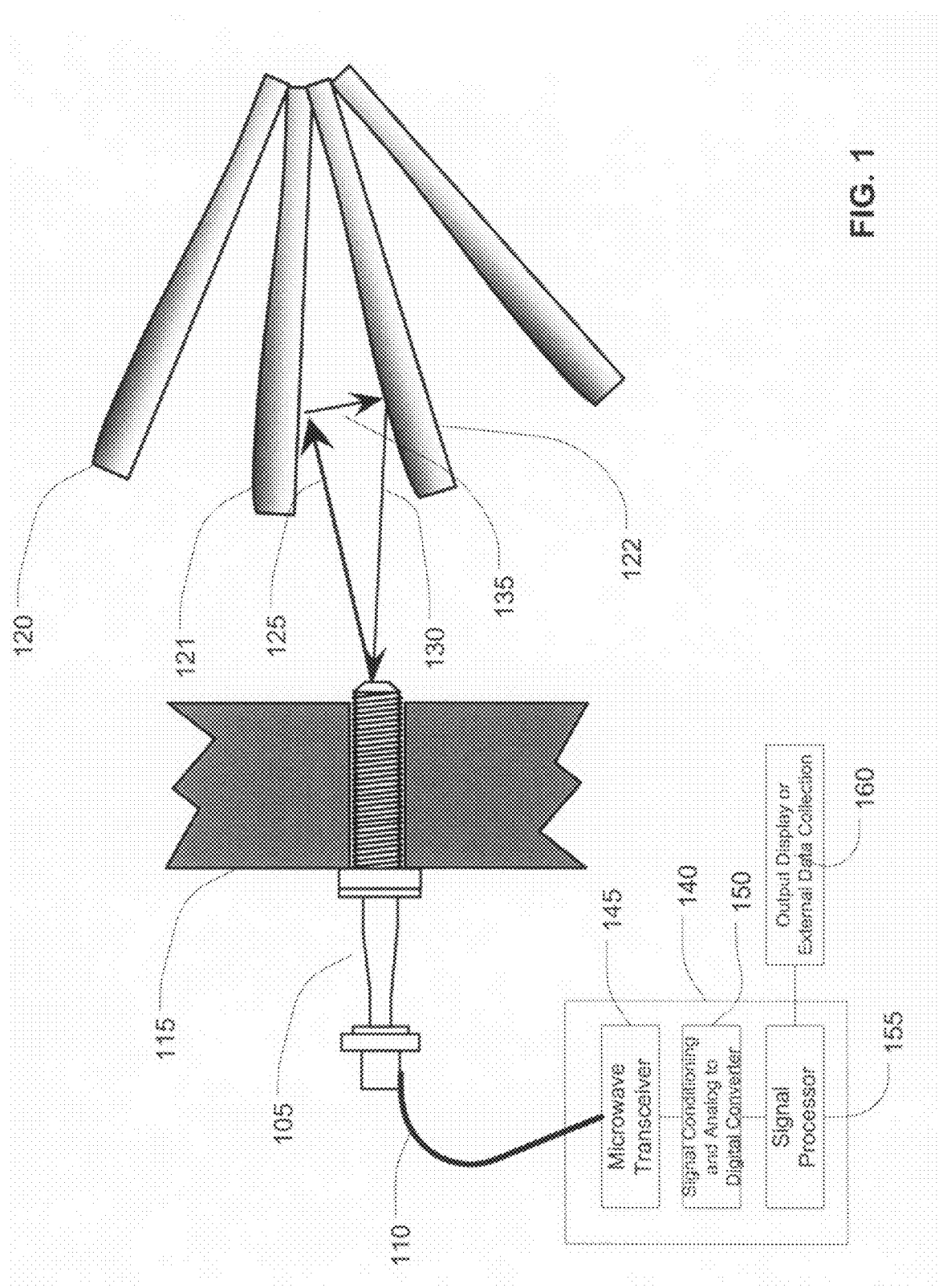
FIG. 1 is the cut-away view of an exemplary installation of a microwave sensor and a representation of interfering clutter signals returned to the antenna in accordance with one embodiment of the present invention.
Figure 3:
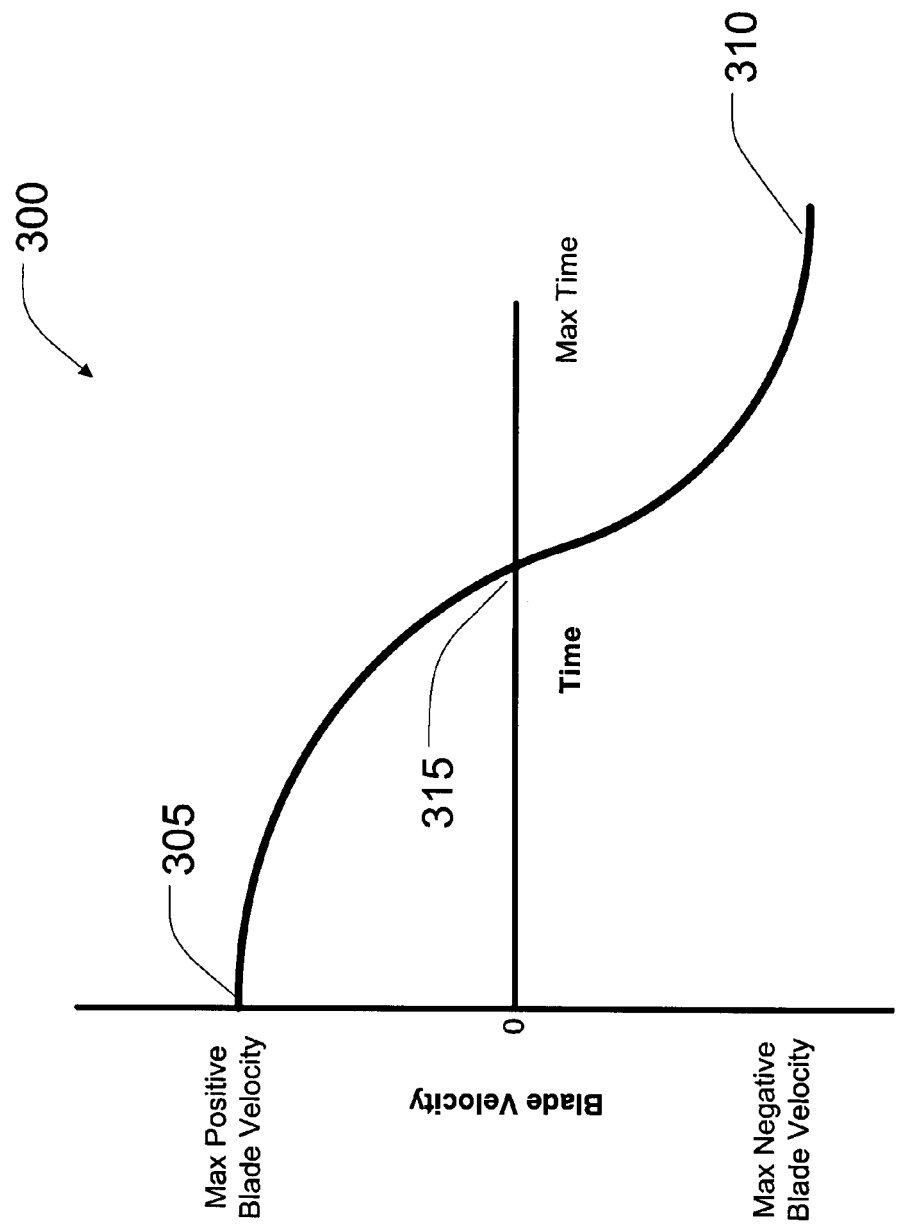
FIG. 3 is a graphic representation of blade velocity versus time for a single blade as it passes by the antenna in accordance with one embodiment of the present invention.
Figure 4:
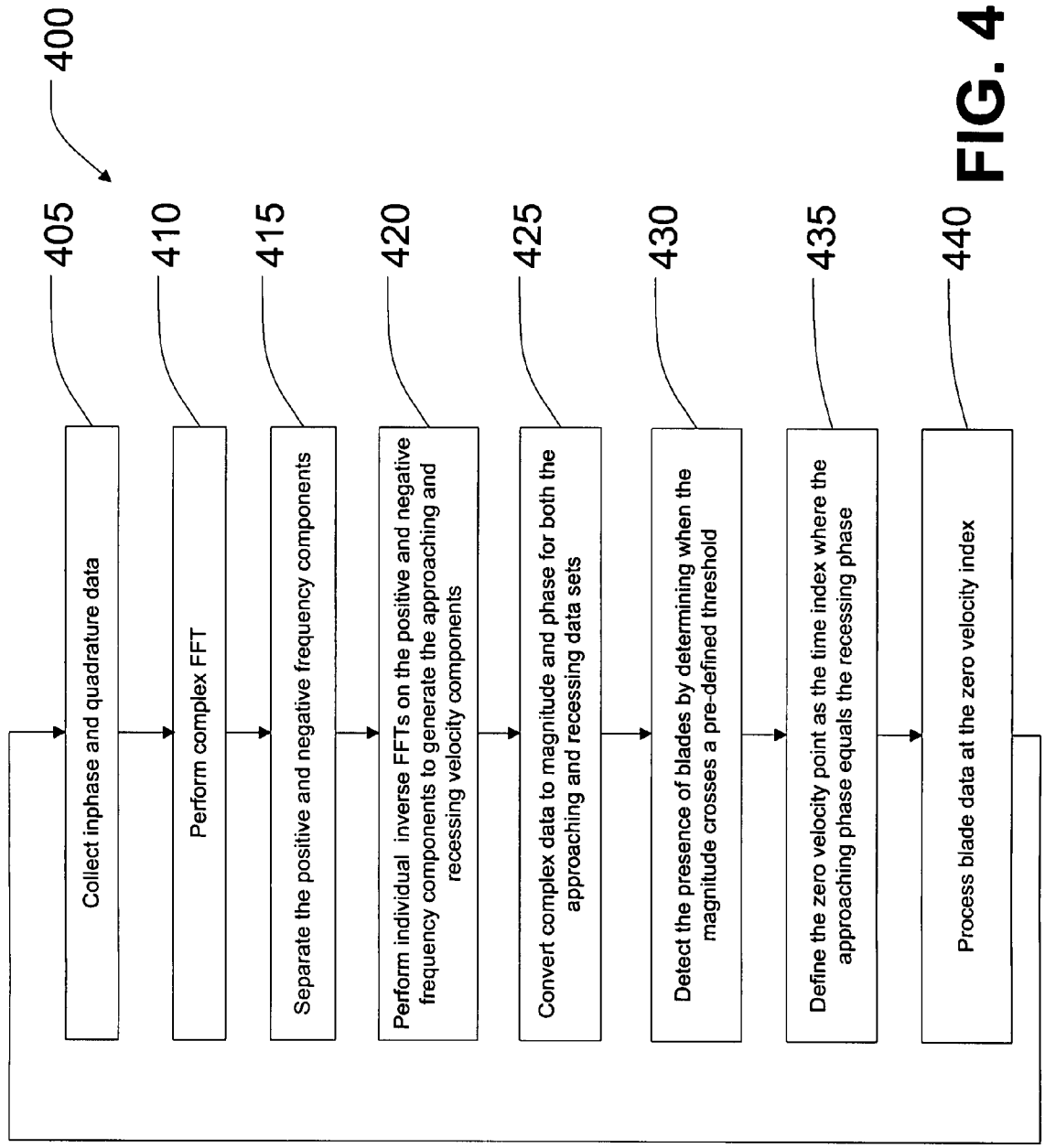
FIG. 4 is a flow chart diagram illustrating a process for blade tip measurement in accordance with an exemplary embodiment of the present invention.
Figure 5:
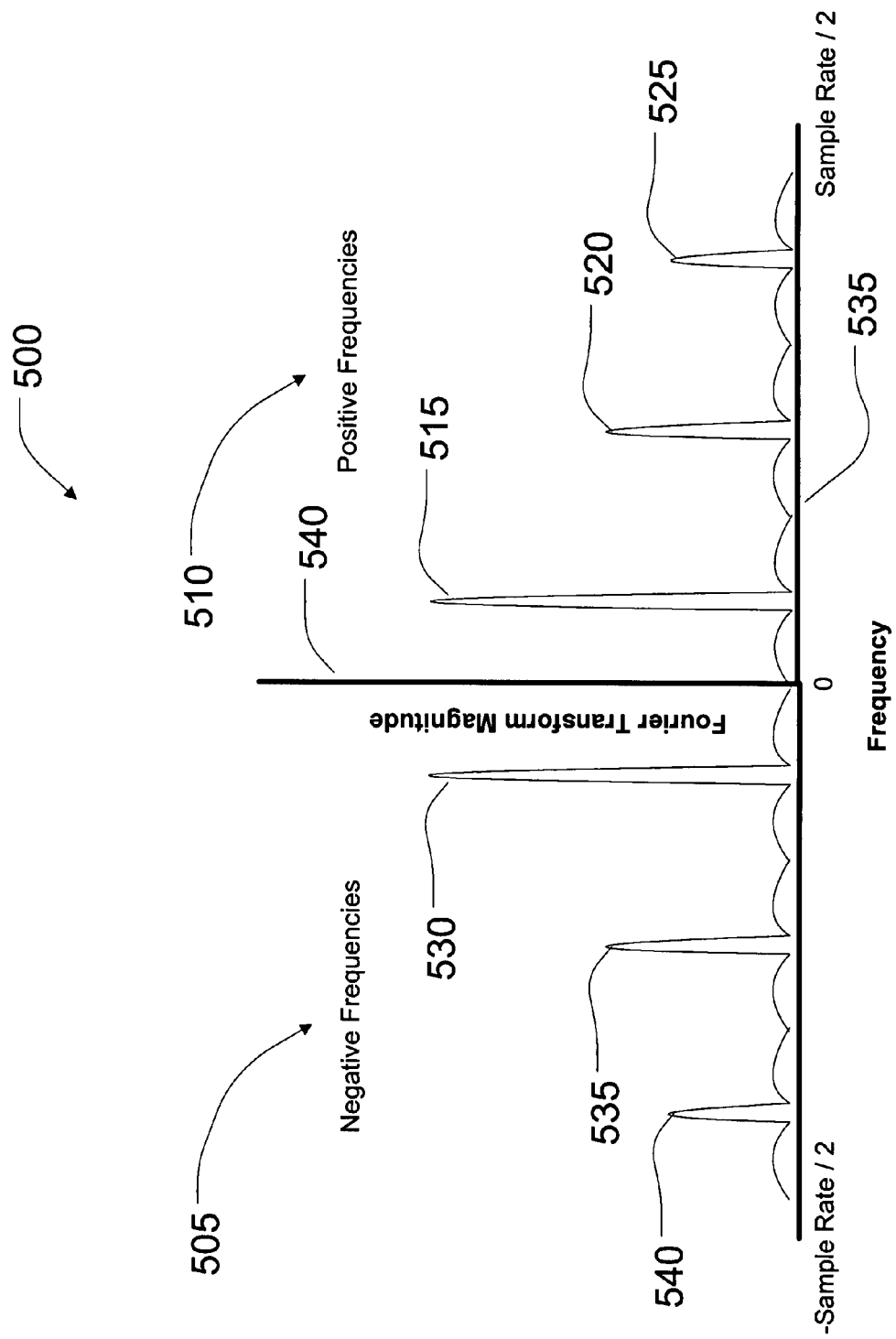
FIG. 5 is an illustration of a FFT magnitude output for received coherent microwave sensor data showing the approaching (positive) and recessing (negative) frequencies in accordance with one embodiment of the present invention.
Figure 6:
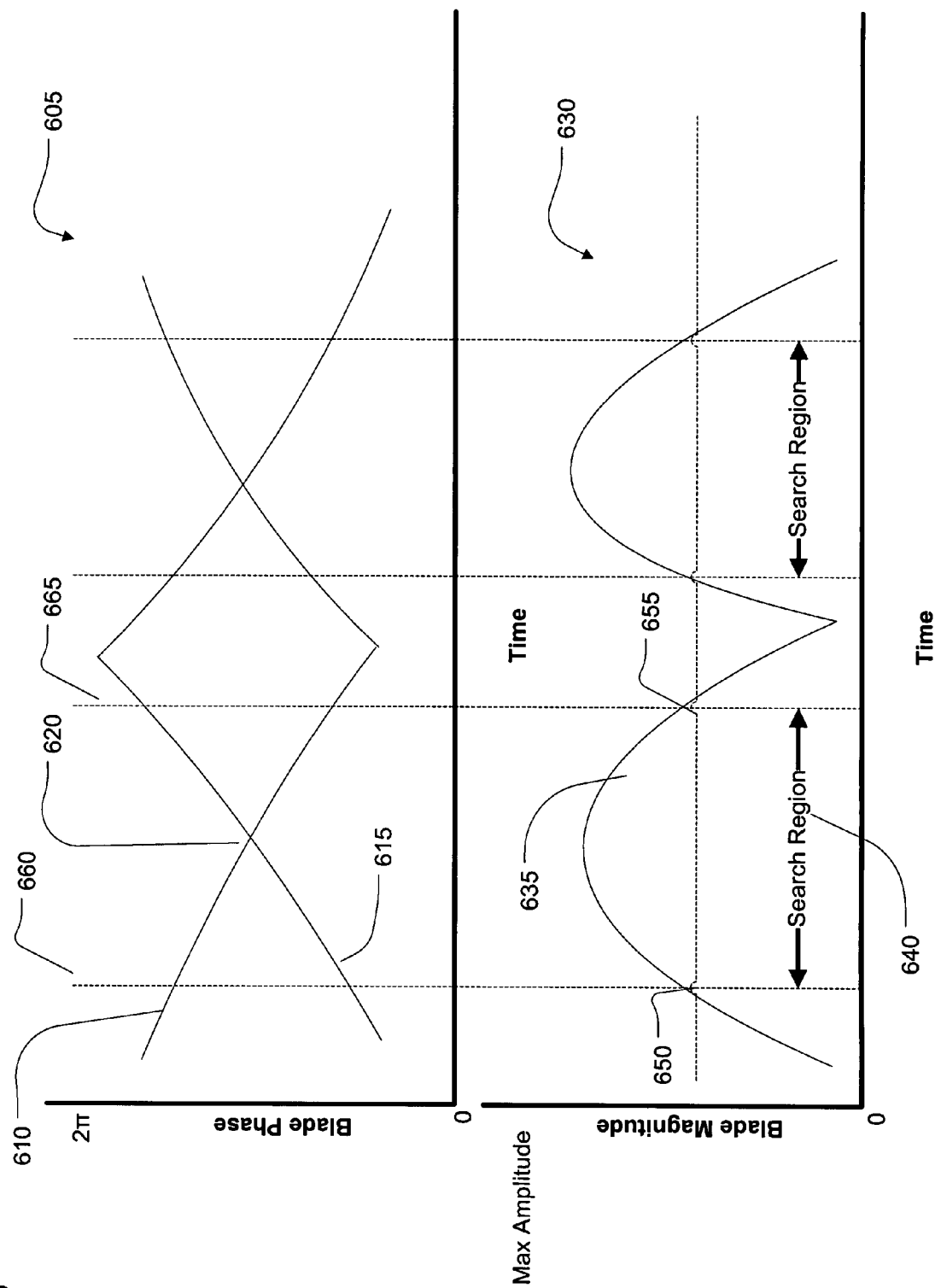
FIG. 6 is an exemplary graph showing a methodology for selecting blade areas and choosing the zero velocity point for blade measurements in accordance with one embodiment of the present invention.

Exemplary embodiments of the present invention will now be described more fully hereinafter with reference to FIGS. 1-6, in which embodiments of the invention are shown. FIG. 1 is the cut-away view of an exemplary installation of a microwave sensor and a representation of interfering clutter signals returned to the antenna in accordance with one embodiment of the present invention. FIG. 2a is a representation of a blade being measured by a microwave sensor, where the blade of interest (the center blade) moves with an approaching velocity with respect to the sensor's antenna in accordance with one embodiment of the present invention. FIG. 2b is a representation of a blade being measured by a microwave sensor, where the blade of interest (the center blade) is positioned at the zero velocity point with respect to the sensor's antenna in accordance with one embodiment of the present invention. FIG. 2c is a representation of a blade being measured by a microwave sensor, where the blade of interest (the center blade) moves with a receding velocity with respect to the sensor's antenna in accordance with one embodiment of the present invention. FIG. 3 is a graphic representation of blade velocity versus time for a single blade as it passes by the sensor's antenna in accordance with one embodiment of the present invention. FIG. 4 is a flow chart diagram of a process for blade measurement in accordance with an exemplary embodiment of the present invention. FIG. 5 is an FFT magnitude output for received coherent microwave sensor data showing the approaching (positive) and recessing (negative) frequencies in accordance with one embodiment of the present invention. FIG. 6 is an exemplary graph showing a methodology for selecting blade areas and choosing the zero velocity point for blade measurements in accordance with one embodiment of the present invention.

This invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all representative "examples" given herein are intended to be non-limiting, and among others, supported by exemplary embodiments of the present invention.

FIG. 1 shows an exemplary microwave antenna 105 installed within the casing of a turbine engine 115 for measuring a particular blade of interest, such as blade 121, rotating within the casing. Blade 121 has blade 120 and blade 122 on either side of it. The antenna 105 is connected to sensor electronics 140 via a coaxial cable or waveguide 110. The antenna 105 comprises an antenna that can survive within the operating environment of the turbine engine 115, typically at a temperature of at least 600° F., and transmit microwave signals that would be reflected by the blades. In its preferred embodiment, the antenna is a microstrip patch antenna made on a ceramic substrate with a metal housing made of a high temperature alloy such as inconel. The combination of the antenna 105 and the sensor electronics 140 is typically referred to as a microwave sensor.

For an exemplary embodiment, the sensor electronics 140 comprises three major subcomponents, a microwave transceiver 145, a signal conditioning and analog-to-digital converter 150, and a signal processor 155. The microwave transceiver 145 transmits microwave energy to the antenna for transmission within the casing of the turbine engine and receives energy reflected back from the rotating blades. In a preferred embodiment, the receiver component of the transceiver 145 is implemented as a standard zero-IF homodyne configuration. Other types of receivers, such as a super heterodyne, pulse Doppler or digital I/Q receiver, may be used for the blade measurements discussed herein. The receiver is capable of measuring both magnitude and phase of the received signal, i.e., the receiver features a coherent design. In the preferred zero-IF homodyne configuration, two channels, an in-phase channel and a quadrature channel, are available as baseband outputs from the receiver.

The signal conditioning and analog-to-digital converter module 150 typically comprises low pass filtering to remove noise before the analog to digital conversion stage and amplification and DC offset adjustment to optimize the dynamic range of the analog-to-digital converter. In a preferred embodiment, the typical low pass cutoff frequencies for the low pass filter are set at several MHz and up to 50 MHz depending on the maximum blade tip speed of the engine. The signal conditioning function processes the analog in-phase and quadrature channel signals output by the transceiver 145. In turn, the analog-to-digital converter converts these signals to a digital format at speed of at least twice the low pass cutoff frequency. This ensures that the thermal noise within the overall measurement system is minimized. The digitized signals are processed by a signal processor 155. The signal processor 155 can be implemented by a microprocessor, such as a PowerPC 405 processor, or a digital signal processor (DSP), such as a Texas Instrument TMS320c6414 processor. Once the digitized signals have been processed and a measurement has been made, the blade information is sent to an output display or an external data collection device 160. The data may be output to the data collection device 160 in digital form via RS-232, MODBUS, TCP/IP or other similar digital communications protocol. In the alternative, the data can be output as an analog signal such as a 0-20 mA or voltage output for recording by another system.

FIG. 1 also illustrates a condition where microwave energy 125 emanating from the antenna 105 bounces off of the side of blade 121 rather than off of a desired blade tip. In this scenario, transmit energy 125 hits the side of blade 121 resulting in reflection 135 which, in turn, hits blade 122 before reflection 130 returns back to the antenna 105. Interference can be caused with the primary measurement when the antenna 105 receives reflections that represent signal reflections from a blade side rather than a blade tip. Representative measurement techniques for the operating environment of a gas turbine engine are disclosed in U.S. Pat. No. 6,489,917, which is fully incorporated herein by reference.

FIG. 2a is a representation of a blade being measured by a microwave sensor in the condition where the blade of interest has a positive velocity towards the sensor's antenna. Blade 121 is the blade to be measured; blade 122 has just passed by the antenna 105; and blade 120 will be the next blade to be measured. In the scenario of FIG. 2a, the blade of interest, blade 121 is approaching the antenna 105. Blade 121 will have a positive velocity towards the antenna, while blade 122 will have a negative velocity because it has already passed by the antenna 105. Because the boresight of antenna 105 is between the blades 121 and 122, most of the reflected energy received by the antenna is derived from the sides of these two blades.

FIG. 2b is a representation of a blade being measured by a microwave sensor where the blade of interest has zero velocity with respect to the sensor's antenna. Blade 122 has a negative velocity because it is moving further away from antenna 105 and blade 120 has a positive velocity. Most of the reflected energy back to antenna 105 is from the blade tip of blade 121. Because blade 121 is positioned exactly under the antenna 105, the blade has a zero velocity—it is neither moving toward nor away from the antenna.

FIG. 2c is a representation of a blade being measured by a microwave sensor where the blade of interest has negative velocity with respect to the sensor's antenna. Blade 122 has a negative velocity because it is moving further away from antenna 105 and blade 120 has a positive velocity. For this sequence of rotating blades, however, blade 120 is now moving away from the antenna 105 and has a negative velocity.

FIG. 3 is a graphical representation of blade velocity with respect to the antenna of a microwave sensor. A graph 300 represents time on the x-axis and velocity on the y-axis. Positive velocity is represented by the blade approaching antenna 105 while negative velocity is represented by the blade moving away from the antenna. The actual velocity can be calculated by multiplying the radial velocity times the cosine of the angle between the blade and the antenna 105. As shown in graph 300, the blade starts out at its maximum positive velocity 305 while approaching the antenna 105. As the blade nears the location of the antenna 105, the velocity decreases to a point where it reaches a zero velocity 315. As the blade starts to move away from antenna 105, the velocity becomes negative and eventually reaches a maximum negative velocity 310.

FIG. 4 is a logical flow chart diagram showing an exemplary process 400 for blade tip measurements. In general, the process 400 can detect signal peaks, filter extraneous signals, such as clutter, and identify velocity components in support of the removal of signal artifacts created by each blade on either side of the blade of interest. The process 400 can be implemented in software or firmware that operates on the signal processor 155.

For the first step 405, the signal processor 155 collects coherent in-phase and quadrature data from the analog-to-digital converter of the module 150. In the next step 410, a complex Fast Fourier Transform (FFT) is calculated for the in-phase and quadrature signal components. It will be understood by those of skill in the art that the component data can be zero-padded to a power of two as needed to speed-up the standard FFT algorithm. In addition, standard FFT windowing functions can be used to reduce side lobe characteristics. The output of the complex FFT yields information in both positive and negative frequency space. Positive frequencies represent the frequency content of blades approaching antenna 105; negative frequencies represent frequency content of blades moving away from antenna 105.

In step 415, the positive and negative frequency components are separated. This can be accomplished by making two copies of the FFT data arrays and adding zeros to one-half of the spectrum or the other half For example, if the positive frequencies are inversed, then all of the data values corresponding to the negative frequency portion of the spectrum would be set to zero and vice versa.

At step 420, an inverse Fast Fourier Transform (IFFT) is performed on the separated positive frequencies and negative frequency components. If a windowing function was performed during the step 410, however, then the window should be reversed for the IFFT output data. The final output comprises two complex sets of time domain data, one representing the approaching blade content and one representing the receding blade content.

At step 425, the time domain data sets are converted to magnitude and phase values. This can be accomplished by using a standard rectangular-to-polar conversion well known to those versed in the art.

In step 430, the areas of the time domain data where the blades are present can be identified by identifying the areas where the returned signal strength (the magnitude value from step 425) crosses a pre-defined threshold. In turn, the sections of data corresponding to blades are passed to step 435, where the measurement point is identified by the location where the positive and negative phases are equal. The zero velocity point can be selected by completing a vector subtraction between the two data sets and determining the minimum point. In practice, phase data can be used to detect the point where the two phases cross one another. This phase data-based technique can achieve additional noise rejection. The index of the time domain data is defined by the zero velocity point, where the approaching phase equals the recessing phase.

The zero velocity index is passed to a blade processing module (not shown) where, in step 440, a conventional blade processing algorithm, as known to those versed in the art, can be run on the blade data. Typical processing would include calculating the blade tip clearance from the signal phase, or the time of arrival from the index and knowing the sample rate of the system.

FIG. 5 shows a representative Fourier transform result derived from blade data, such as the blade data output in step 410 of the process 400. Because the time domain data for blades often looks like an interrupted signal as the blades come in front of and then away from the sensor's antenna, the spectrum tends to have a large number of harmonics. Positive frequency harmonics 515, 520, and 525 and negative frequency harmonics 530, 535, and 540 can be seen on graph 500. All positive frequency content 510 on the right hand side of graph 500 is from time domain data of blades approaching antenna 105. All negative frequency content 505 on the left hand side of graph 500 is from time domain data of blades recessing from antenna 105.

FIG. 6 shows an exemplary methodology for detecting the presence of blades (step 430) and defining the zero velocity point (step 435). Graph 630 shows a plot of the blade magnitude versus time. Each time a blade passes the sensor's antenna, the magnitude will rise to a maximum value and then start to decrease again as the blade moves away. Due to the complex geometry of the blade, however, the maximum amplitude location is not necessarily the zero velocity point.

When the magnitude of the blade signal 635 crosses a pre-defined threshold, at point 650, a blade is present. When the magnitude of the blade signal drops below the threshold, at point 655, the blade is considered not to be present. The result is an area of time where the blade is present between points 650 and 655, referred to as the search region 640 or blade region. Once the search region is defined, the same area of time is examined in the blade phase plot 605. The area of time to examine on the blade phase plot is noted between points 660 and 665. This graph shows two separate plots: the phase of the approaching time domain signal 620 and the phase of the recessing time domain signal 615. The approaching time domain signal follows a monotonically decreasing trajectory, except when phase wraps occur between +pi to –pi (or 0 to 2 pi depending on how the phase is defined). The recessing time domain signal follows a monotonically increasing trajectory, except when phase wraps occur between +pi to –pi (or 0 to 2 pi depending on how the phase is defined). For each blade, there is a single point 620 where the approaching and recessing phase values cross. This is defined as the zero velocity point that is used for blade data processing, such as blade tip data. A standard crossing detection method known to one versed in the art can be used to support the processing tasks shown in the charts of FIG. 6.

In summary, one aspect of the present invention provides a method for completing a blade measurement for rotating blades within a casing of a turbine engine. An antenna coupled to a microwave sensor outputs microwave energy via an antenna within the casing of the turbine engine. In-phase and quadrature data are collected by a receiver of the microwave sensor, the data associated with, at least in part, microwave energy reflected by the blades and the casing. A complex Fast Fourier Transform (FFT) is performed on the in-phase (I) and quadrature (Q) data to generate positive frequency components and negative frequency components. The positive negative frequency components are separated from the negative frequency components. In turn, an inverse FFT is performed on each of the positive frequency components and the negative frequency components to generate complex time domain data associated with approaching and recessing velocity components. The complex time domain data is converted to magnitude and phase values, the magnitude values comprising approaching and recessing magnitude values and the phase values comprising approaching and recessing phase values. A blade region associated with a location for one of the blades proximate to the antenna is defined by a pair of crossings of the magnitude values with a predetermined threshold. A zero point velocity is identified as the point where one of the approaching phase values equals one of the recessing phase values. In the context of the blade region, the zero point velocity represents a location of the blade directly beneath the antenna, i.e., the blade of interest.

Blade data for the blade of interest can be processed by using the zero point velocity as an index. Blade data is represented by parameters that can be generated from in-phase and quadrature component data, including phase, magnitude, and time of the detected blade peak. For example, phase can converted to distance or blade tip clearance. Magnitude is proportional to the amount of energy reflected back by the blade (calculated by the square root of the sum of squares of the in-phase and quadrature data). Time of arrival can be calculated by noting the sample where the peak occurred and calculating the time between the last peak knowing the sample rate.

What is claimed is:

1. A method for completing a blade measurement for rotating blades within a casing of a turbine engine, comprising the steps of:

transmitting microwave energy via an antenna within the casing of the turbine engine;

collecting in-phase and quadrature data associated with the microwave energy reflected by the blades and the casing;

performing a complex Fast Fourier Transform (FFT) on the in-phase and quadrature data to generate positive frequency components and negative frequency components;

separating the positive negative frequency components from the negative frequency components;

performing an inverse FFT on each of the positive frequency components and the negative frequency components to generate complex time domain data associated with approaching and recessing velocity components;

converting the complex time domain data to magnitude and phase values, the magnitude values comprising approaching and recessing magnitude values and the phase values comprising approaching and recessing phase values;

identifying each crossing of the magnitude values with a predetermined threshold to define a blade region associated with a location for one of the blades proximate to the antenna;

for the blade region, identifying a zero point velocity as the point where one of the approaching phase values equals one of the recessing phase values, the zero point velocity representing a location of the blade directly beneath the antenna; and processing blade data using the zero point velocity as an index.

2. The method of claim 1 further comprising repeating each of the above-identified steps for another one of the blades.

* * * * *